United States Patent
Oroskar et al.

(10) Patent No.: US 9,660,706 B1
(45) Date of Patent: May 23, 2017

(54) INCREASING MIMO ORDER TO HELP OFFSET REDUCTION IN QUANTITY OF SERVING CARRIERS

(71) Applicant: Sprint Spectrum L.P., Overland Park, KS (US)

(72) Inventors: Siddharth S. Oroskar, Overland Park, KS (US); Jasinder P. Singh, Olathe, KS (US); Nitesh Manchanda, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/222,408

(22) Filed: Jul. 28, 2016

(51) Int. Cl.
*H04B 7/02* (2006.01)
*H04B 7/0413* (2017.01)
*H04B 7/06* (2006.01)
*H04W 72/04* (2009.01)

(52) U.S. Cl.
CPC ......... *H04B 7/0413* (2013.01); *H04B 7/0697* (2013.01); *H04W 72/042* (2013.01)

(58) Field of Classification Search
CPC . H04L 5/001; H04L 1/06; H04L 27/00; H04L 27/20; H04B 7/024; H04B 7/0413
See application file for complete search history.

(56) References Cited

U.S. PATENT DOCUMENTS

| | | | |
|---|---|---|---|
| 2009/0052578 A1 | 2/2009 | Sawai | |
| 2016/0127997 A1* | 5/2016 | Ang | H04W 52/0216 370/311 |
| 2016/0157133 A1* | 6/2016 | Ehsan | H04W 28/22 370/252 |

OTHER PUBLICATIONS

Hidekazu Taoka, et al., "Technology Reports—MIMO and CoMP in LTE-Advanced," NTT DOCOMO Technical Journal, vol. 12, No. 2, Sep. 2010.
"LTE Physical Layer Overview," http://rfmw.em.keysight.com/sireless/helpfiles/89600b/webhelp/subsystems/lte/Content/lte_overview.htm, printed from the World Wide Web Jul. 18, 2016.
GaussianWaves, "MIMO—Diversity and Spatial Multiplexing," http://www.gaussianwaves.com/2014/08/mimo-diversity-and-spaital-multiplexing/, printed from the World Wide Web Jul. 18, 2016.
Radio-Electronics, "LTE MIMO: Multiple Input Multiple Output Tutorial," http://www.radio-electronics.com/info/cellulartelecomms/lte-long-term-evolution/lte-mimo.php, printed from the World Wide Web Jul. 25, 2016.

* cited by examiner

*Primary Examiner* — David S. Huang (57) ABSTRACT

When a base station encounters a trigger to reduce the number of carriers on which the base station serves a wireless commination device (WCD), the base station will responsively reduce the number of carriers but will also responsively increase the number of multiple-input multiple-output (MIMO) layers on which the base station serves the WCD, to help offset for the reduction in number of serving carriers.

20 Claims, 5 Drawing Sheets

INCREASING MIMO ORDER TO HELP OFFSET REDUCTION IN QUANTITY OF SERVING CARRIERS

BACKGROUND

In a wireless communication system, a base station provides one or more coverage areas, such as cells or sectors, in which the base station can serve wireless communication devices (WCDs), such as cell phones, wirelessly-equipped personal computers or tablets, tracking devices, embedded wireless communication modules, or other devices equipped with wireless communication functionality.

In general, each coverage area could operate on one or more carriers each defining one or more ranges of frequency spectrum and having a respective downlink channel for carrying communications from the base station to UEs and a respective uplink channel for carrying communications from the UEs to the base station. Such carriers could be frequency division duplex (FDD), in which the downlink and uplink channels are defined as separate respective ranges of frequency, or time division duplex (TDD), in which the downlink and uplink channels are defined on a common range of frequency but are distinguished through time division multiplexing. Further, the downlink channel and uplink channel of each carrier could also be divided into respective sub-channels for carrying particular communications, such as one or more control channels for carrying control signaling and one or more traffic channels for carrying application-layer data and other traffic.

In an example system, for instance, the air interface could be divided over time into frames and sub-frames each defining two slots, and the uplink and downlink channels could each be divided over their frequency bandwidth into sub-carriers that are grouped within each slot into resource blocks, with portions of each sub-frame further defining various control channels for signaling communication between the base station and WCDs.

OVERVIEW

When a WCD is positioned within coverage of a base station, the WCD may attach with the base station on a particular carrier on which the base station is configured to provide service, and the base station could then schedule particular downlink and uplink resource blocks on that carrier to carry data communications to and from the WCD. Further, the base station and WCD could modulate their air interface data communications at a coding rate selected based on quality of the WCD's coverage, such as with higher rate coding rate when the WCD is in better coverage of the base station and with a lower coding rate when the WCD is in worse coverage of the base station.

In the example system noted above, for instance, when the base station has data to transmit to a WCD, the base station could assign certain downlink resource blocks (and thus certain sub-carriers) in a given sub-frame for use to carry the data to the WCD at a particular coding rate, and the base station could then (i) transmit to the WCD in that sub-frame a downlink control information (DCI) message that specifies the assigned resource blocks and coding rate and (ii) encode and transmit the data to the WCD in the assigned resource blocks in that sub-frame. Per the DCI message, the WCD could then read the transmitted data from the assigned resource blocks. Likewise, when the WCD has data to transmit to the base station and accordingly transmits a scheduling request to the base station, the base station could assign certain uplink resource blocks in a given sub-frame for use to carry the data from the WCD at a particular coding rate and could transmit to the WCD, in advance of that sub-frame, a DCI message that specifies the assigned resource blocks and coding rate. And the WCD could then encode and transmit the data to the base station in the assigned resource blocks in that sub-frame.

In practice, a base station could serve a WCD on a single carrier, such as the carrier on which the WCD attaches with the base station, in which case the base station may allocate resources on that carrier for use to carry communications to and from the WCD. Alternatively, the base station could serve the WCD on multiple carriers at once, providing "carrier aggregation" service. With carrier-aggregation service, the base station would serve the WCD concurrently on multiple carriers from either contiguous frequency bands or non-contiguous frequency bands. And when faced with a need to schedule data communication to or from the WCD in a given subframe, the base station would then distribute the data communication concurrently among the multiple carriers, allocating resources on each carrier respectively to carry some of the data.

Further, a base station and WCD could also be configured to engage in air interface communication with each other using multiple-input multiple-output (MIMO) technology with spatial multiplexing. MIMO provides for air interface communication concurrently on multiple different radio-frequency propagation paths, from multiple transmit-antennas at the transmitting end (e.g., at the base station or WCD) to multiple receive-antennas at the receiving end (e.g., at the WCD or the base station). With spatial multiplexing, when the transmitting end has data to transmit to the receiving end, the data is multiplexed (e.g., time division multiplexed) onto multiple antenna output ports and thus onto multiple RF propagation paths, so that a separate portion of the data is transmitted respectively on each propagation paths. In this arrangement, each propagation path is considered to be a MIMO "layer".

MIMO communication service could be characterized by how many transmit antennas (or transmit antenna groups), T, are used and how many receive antennas (or receive antenna groups), R, are used, as T×R MIMO service. Further, if T and R are equal, then the number of MIMO layers could be considered equal to T and R, whereas if T and R are different, then the number of MIMO layers could be considered the lesser of the two. Thus, MIMO service with two transmit antennas and two receive antennas (2×2 MIMO) could be considered to have two layers, MIMO service with four transmit antennas and four receive antennas (4×4 MIMO) could be considered to have four layers, and MIMO service with two transmit antennas and one receive antenna (2×1 MIMO) or with just one transmit antenna and one receive antenna (1×1 MIMO—still MIMO, but effectively single-input single-output (SISO)) could be considered to have just one layer. Other examples and characterizations of MIMO modes and MIMO layers are possible as well, within the understanding of those of ordinary skill in the art.

When a base station serves a WCD on a single carrier using MIMO with M layers, the base station could specify the MIMO configuration in the base station's DCI message to the WCD when scheduling data communication to or from the WCD to occur on particular air interface resources. In accordance with that MIMO specification, the base station and WCD may then each make use of the indicated (or associated) number of antennas for their air interface communication with each other, with the data communication being spatially multiplexed over the indicated (or associated) number of layers. Thus, for communication in a given subframe, the base station could allocate particular air interface resources (e.g., particular resource blocks) for communication to or from the WCD and could specify use of M MIMO layers; and all M of the MIMO layers could then share those allocated air interface resources, being distinguished from each other by at least their spatially separate RF propagation paths.

Likewise, when a base station serves a WCD on multiple carriers concurrently (with carrier aggregation) and uses MIMO with M layers, the base station could similarly specify the MIMO configuration in its DCI message to the WCD when scheduling data communication to or from the WCD to occur on particular air interface resources respectively on each carrier. In accordance with that MIMO specification, the base station and WCD may then likewise each make use of the indicated (or associated) number of antennas for their air interface communication with each other, with the data communication being spatially multiplexed over the indicated (or associated) number of layers on each carrier. Thus, for communication in a given subframe, the base station could allocate particular air interface resources (e.g., particular resource blocks) respectively on each of the carriers. And on each carrier, all M of the MIMO layers could share the air interface resources allocated on the carrier, being distinguished from each other by at least their spatially separate RF propagation paths.

At times, when a base station is serving a WCD on multiple carriers, the base station may encounter a situation where the base station may wish to reduce the number of carriers on which the base station serves the WCD. By way of example, the base station could determine that its coverage area (e.g., across all of its carriers) is threshold highly loaded, with a great number of served WCDs and/or with a great extent of data communication occurring, and that it would be useful to increase air interface capacity. The base station could detect such a load situation by evaluating various metrics, such as number of attached WCDs, number of actively connected and communicating WCDs, percent of traffic channel use, percent of control channel use, or the like, considering actual current use or time-of-day trends or the like. Alternatively, the base station could detect other triggers for reducing the number of carriers on which the base station serves the WCD, such as excessive data communication by the WCD, scheduled service changes, or the like.

When a base station reduces the number of carriers on which it serves a WCD, the result could be a reduction in data throughput for the WCD. For instance, if the base station switches from serving the WCD on two carriers to serving the WCD on just one carrier, assuming the carriers are the same bandwidth as each other for sake of example, the base station may thereby cut in half the frequency bandwidth available for scheduling communications to or from the WCD. As a result, the base station might schedule half as much data communication per subframe to or from the WCD, thus possibly cutting the WCD's throughput in half.

In accordance with the present disclosure, when a base station encounters a desire to reduce the number of carriers on which the base station serves a WCD, the base station will responsively reduce the number of carriers, but the base station will also responsively increase the MIMO order of the base station's service to the WCD, so as to at least partially offset the reduced throughput resulting from the reduction of number of serving carriers. For example, if the base station is initially serving the WCD on two carriers and with just one MIMO layer (1×1 MIMO, effectively SISO as noted above), and the base station reduces the number of serving carriers to just one, the base station could at the same time increase the number of MIMO layers to two (e.g., to 2×2 MIMO). That way, although the base station would then allocate air interface resources (e.g., resource blocks) on just the one serving carrier, two MIMO layers would share those allocated resources, thus at least partially offsetting for the reduction in carriers, i.e., at least partially offsetting the reduced throughput resulting from the reduced number of serving carriers.

In practice, multiple MIMO layers could interfere with each other to some extent. Considering this, to enable quality MIMO communication with spatial multiplexing, the base station could also require, as a condition of increasing the number MIMO layers, that the WCD be in threshold good RF coverage. Thus, if the WCD is in poor RF coverage, the base station may responsively forgo increasing the number of MIMO layers for its communication with the WCD when the base station reduces the number of carriers on which it serves the WCD (or the base station may responsively forgo reducing the number carriers on which it serves the WCD, to avoid the issue). Whereas if the WCD is in threshold good RF coverage, then the base station may responsively increase the number of MIMO layers for its communication with the WCD when the base station reduces the number of carriers on which it serves the WCD. The thresholds for this purpose could be set by engineering design.

Accordingly, in one respect, disclosed herein is a method of controlling communication over an air interface between a base station and a WCD. As disclosed, the method includes configuring service of the WCD by the base station to be concurrently on a quantity N of carriers on the air interface, where N>1, and the base station serving the WCD with the configured service on the quantity N of carriers using MIMO communication with spatial multiplexing defining M layers of communication on each of the N carriers, wherein M≥1. Further, the method includes the base station detecting a trigger and responsively (i) re-configuring the service of the WCD to be on a reduced quantity N' of carriers, wherein N'<N and wherein N'≥1, and (ii) at least partially offsetting the reduction in quantity of carriers of the service by modifying the MIMO communication to be with spatial multiplexing defining an increased quantity M' of layers of communication on each carrier of the reduced quantity N' of carriers, wherein M'>M and wherein M'≥2, possibly further conditioning the increase in quantity of MIMO layers on a determination that the WCD is in threshold good RF coverage (or is not in threshold poor RF coverage).

In another respect, disclosed is a method of controlling communication over an air interface between a base station and a, wherein the base station serves the WCD on a quantity of carriers and with MIMO communication on a quantity of MIMO layers each distributed across the carriers. As disclosed, the method includes the base station detecting a trigger to increase air interface capacity. Further, the method includes, responsive to detecting the trigger, the base station reducing the quantity of carriers on which the base station serves the WCD and, to at least partially offset the reduction in quantity of carriers on which the base station serves the WCD, the base station increasing the quantity of MIMO layers distributed across the carriers on which the base station serves the WCD, with the increase in quantity of MIMO layers possibly being conditioned further on a determination that the WCD is in threshold good RF coverage (or is not in threshold poor RF coverage).

Still further, disclosed is a base station configured to control communication over an air interface between the base station and a WCD. As disclosed, the base station includes an antenna structure (optimally a plurality of antennas, supporting MIMO communication) configured for communication over the air interface, a backhaul communication interface configured for communication on a core access network, and a controller configured to carry out operations such as those described above.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and apparatus will be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
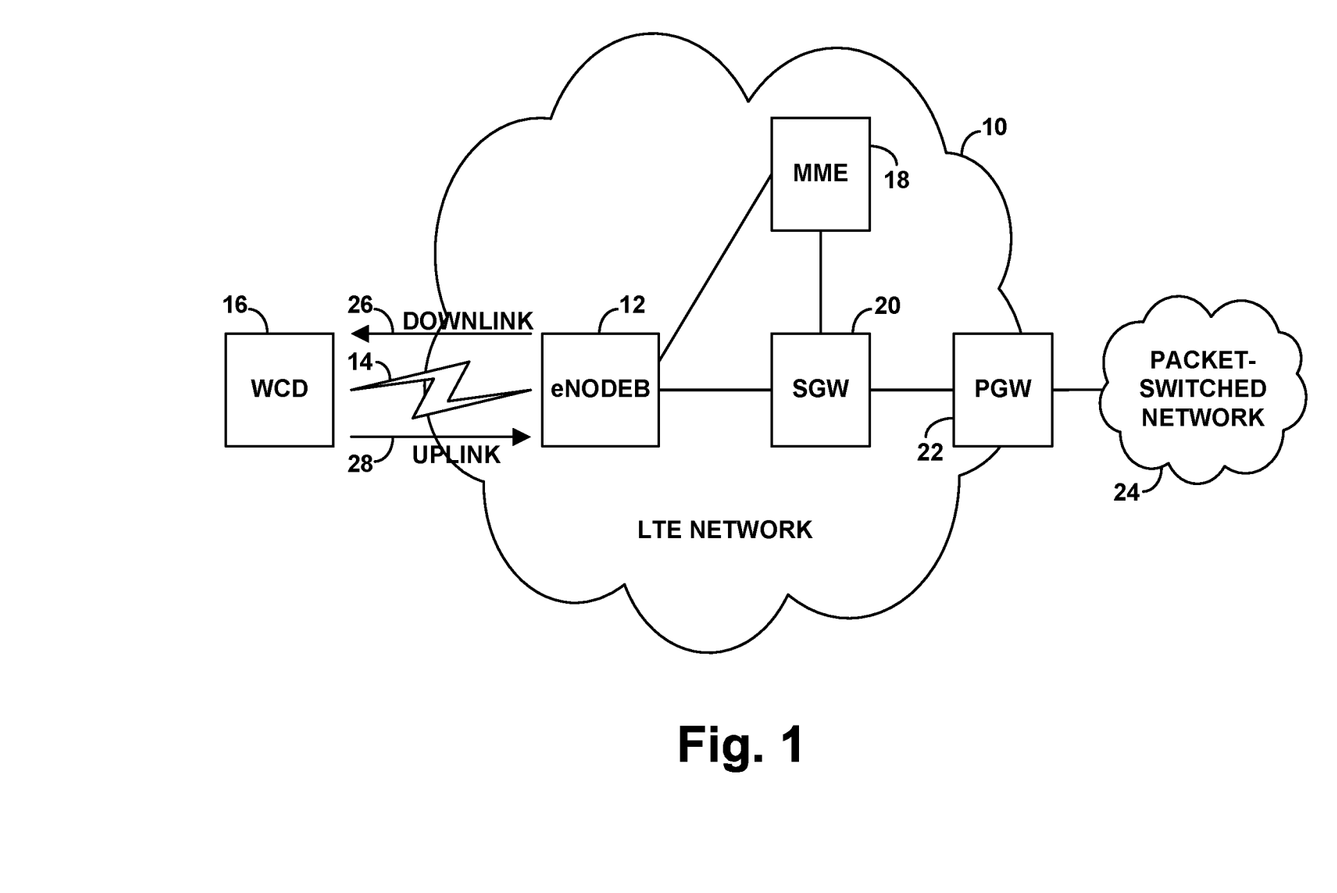
FIG. 1 is a simplified block diagram of a wireless communication system in which the present method and system can be implemented.

Referring to the drawings, as noted above, FIG. 1 is a simplified block diagram of a wireless communication system in which the present method and system can be implemented. In particular, FIG. 1 depicts a representative LTE network 10, which functions primarily to serve WCDs with wireless packet data communication service, including possibly voice-over-packet service, but may also provide other functions.

As shown, the LTE network includes a base station (eNodeB) 12, which has an antenna structure and associated equipment for providing an LTE coverage area 14 in which to serve WCDs such as an example WCD 16 as shown. The eNodeB 12 then has a communication interface with a mobility management entity (MME) 18 that functions as a signaling controller for the LTE network. Further, the eNodeB 12 has a communication interface with a serving gateway (SGW) 20, which in turn has a communication interface with a packet-data network gateway (PGW) 22 that provides connectivity with a packet-switched network 24, and the MME has a communication interface with the SGW 20. In practice, the illustrated components of the LTE network may sit as nodes on a private packet-switched network owned by an operator of the LTE network, and thus the various communication interfaces may be logical interfaces through that network. With the arrangement of FIG. 1, the WCD may engage in communication with various remote communication-entities, such as servers or other end-user devices, on or via network 24.

As illustrated, the air interface of coverage area 14 defines a downlink direction 26 from the eNodeB to the WCD and an uplink direction 28 from the WCD to the eNodeB. Further, the eNodeB and WCD may be configured (e.g., licensed and programmed) to support air interface communication on various particular carriers, which may be FDD or TDD. Each such carrier and/or its particular downlink and uplink channels may span a particular bandwidth (such as 1.4 MHz, 3 MHz, 5 MHz, 10 MHz, 15 MHz, or 20 MHz) and may be identified by one or more globally unique identifiers per industry standard, so that the eNodeB and a served WCD can refer to particular carriers by those identifiers.

According to LTE, each carrier's downlink channel may then define various sub-channels, such as a physical downlink control channel (PDCCH) for carrying scheduling directives and other control signaling from the eNodeB to WCDs, a physical downlink shared channel (PDSCH) defining resource blocks as noted above, for carrying scheduled downlink data communication, and a reference channel for carrying a reference signal that WCDs can monitor to evaluate coverage quality. Likewise, each carrier's uplink channel may define various sub-channels, such as a physical uplink control channel (PUCCH) for carrying scheduling requests and other control signaling from the WCDs to the eNodeB and a physical uplink shared channel (PUSCH) defining uplink resource blocks as noted above, for carrying scheduled uplink data communication.

With this arrangement, when WCD 16 enters into coverage of eNodeB 12, the WCD may detect the eNodeB's coverage on a particular carrier, and the WCD and eNodeB may engage in an attach process or handover process to register with the LTE network on that carrier, configuring service of the WCD by the eNodeB on that carrier. For instance, the WCD may initially transmit an access request message on the carrier to the eNodeB, and the WCD and eNodeB may then engage in signaling in accordance with the Radio Resource Control (RRC) protocol to establish a radio-link-layer connection (RRC connection) on which the WCD and eNodeB can engage in further communication. In turn, the WCD may then transmit to the eNodeB via the RRC connection an attach request seeking to register with the LTE network and be served by the eNodeB, and the eNodeB may pass the attach request along to the MME for processing.

After authenticating the WCD, the MME may then engage in signaling with the eNodeB and SGW to establish for the WCD one or more logical bearer connections, or bearers, between the WCD and the PGW. Each such bearer may include a radio bearer portion over the air between the WCD and the eNodeB, and a service bearer or access bearer portion between the eNodeB and the PGW via the SGW. Further, the eNodeB may store a context record for the WCD, indicating service state and parameters for serving the WCD, such as an identification of the carrier on which the eNodeB is serving the WCD. And the WCD may likewise store a context record indicating its service state and parameters for being served, such as the carrier on which it is being served.

With service of the WCD so configured, the eNodeB may then coordinate data communication to and from the WCD. As the eNodeB receives from the SGW data destined to the WCD, the eNodeB may allocate particular PDSCH resource blocks for carrying that data, the eNodeB may transmit on the PDCCH to the WCD a DCI message specifying the allocated resource blocks, and the eNodeB may transmit the data to the WCD on the specified resource blocks, for receipt by the WCD. Likewise, when the eNodeB receives from the WCD a scheduling request indicating that the WCD has data to transmit, the eNodeB may allocate particular PUCCH resource blocks for carrying that data, the eNodeB may transmit on the PDCCH to the WCD a DCI message specifying the allocated resource blocks, and the WCD may then transmit the data on the specified resource blocks, for receipt by the eNodeB and forwarding to the SGW.

In practice, the eNodeB could serve numerous WCDs concurrently on the carrier. Given the limited bandwidth of the carrier in each subframe, the eNodeB could therefore apply a scheduling process to allocate resources of the carrier as appropriate among its served WCDs. Further, the eNodeB and the WCDs could buffer data as necessary while awaiting scheduled transmission.

At the time of attachment or otherwise while serving a WCD, an eNodeB could also reconfigure service of the WCD to be on a different number of carriers. For instance, once the WCD has attached on a single carrier, the eNodeB could add one or more carriers to the WCD's service so as to then provide the WCD with carrier-aggregation service. Further, when the eNodeB is serving the WCD on multiple carriers, the eNodeB could add one more additional carriers, swap carriers, or remove one or more carriers, possibly reverting to serving the WCD on just a single carrier. To so reconfigure the WCD's service, the eNodeB could generate and transit to the WCD an RRC connection reconfiguration message identifying the carrier(s) on which the eNodeB will serve the WCD, and the eNodeB and WCD could update their context records accordingly, so that they would be prepared to communicate with each other on the identified carrier(s).

When the eNodeB thereby provides the WCD with carrier-aggregation service, the eNodeB may similarly coordinate data communication to and from the WCD, but with the communication occurring on the multiple carriers concurrently. As the eNodeB receives data destined to the WCD, the eNodeB may schedule transmission of that data on particular PDSCH resources respectively of each carrier, the eNodeB may transmit on the PDCCH to the WCD a DCI message specifying the allocated resources per carrier, and the eNodeB may transmit the data to the WCD on the specified resources concurrently on the multiple carriers, for receipt by the WCD. And likewise, when the eNodeB receives from the WCD a scheduling request indicating that the WCD has data to transmit, the eNodeB may allocate particular PUSCH resources respectively on each carrier, the eNodeB may transmit on the PDCCH to the WCD a DCI message specifying the allocated PUSCH resources per carrier, and the WCD may then transmit the data on the specified resources concurrently on the multiple carriers, for receipt by the eNodeB and forwarding to the SGW.

As further noted above, the eNodeB and the WCD may also support MIMO communication defining possibly multiple concurrent layers of data communication, optimally with spatial multiplexing to help distinguish the layers from each other. To facilitate this, the eNodeB and the WCD could each be equipped with multiple separate antennas (or antenna systems, arrays, groups, or the like) arranged or configurable to engage in RF communication on separate respective propagation paths, in a well-known manner. The number of MIMO layers supported by the eNodeB and WCD could depend on their respective antenna configurations. Further, to facilitate scheduling MIMO communication, the eNodeB could learn the WCD's MIMO capability through a WCD-capability report provided during attachment or the like, or from a network-based capabilities-record for the WCD.

When the eNodeB schedules data communication to or from a WCD on allocated air interface resources, whether on a single carrier or on multiple carriers, the eNodeB could configure MIMO communication of the data. To do so, the eNodeB could include in its DCI message to the WCD an indication of the number of MIMO layers, such as by including in a precoding field of the DCI message a bit pattern that maps to the number of layers to be used. With a MIMO configuration where T=R, the number of layers as so specified could be a number that equals T and R, so that a specification of 2 layers could represent 2×2 MIMO, a specification of 4 layers could represent 4×4 MIMO, and a specification of 8 layers could represent 8×8 MIMO, and so forth. (Further, more particular indications could be provided for other MIMO configurations, such as to indicate a MIMO configuration where T and R differ from each other.) With some variation possible, all of the multiple MIMO layers could share the allocated air interface resources. For instance, if the eNodeB allocates ten resource blocks on a carrier and designates two-layer MIMO communication, two separate MIMO layers of data could be transmitted concurrently on the resources of those ten resource blocks, optimally with the two layers being differentiated from each other by their spatial multiplexing. Likewise, if the eNodeB allocates ten resource blocks respectively on each of two carriers, for a total of twenty resource blocks, and the eNodeB designates two-layer MIMO communication, two discrete MIMO layers of data could be transmitted concurrently on the resources of those twenty resource blocks, again optimally with the layers being differentiated from each other by at least their spatially separate RF propagation paths.

As indicated above, there may be situations where the eNodeB will reduce the number of carriers on which the eNodeB serves a WCD. Without limitation, an example of such a situation is where the eNodeB encounters a desire or need to increase air interface capacity. For instance, if the eNodeB is serving a large number of WCDs and/or an extensive amount of data communication, the eNodeB's air interface (perhaps across all of the carriers on which the eNodeB is configured to provide service, or perhaps on one or more specific carriers) could be heavily loaded (e.g., with many resources per unit time being occupied), which could pose a limit on serving additional WCDs and/or additional data communication.

To help increase air interface capacity in such a situation, or in response to one or more other triggers, the eNodeB could reconfigure service of a WCD to reduce the number of carriers on which the eNodeB serves the WCD. For instance, if the eNodeB is currently serving a WCD on three carriers, the eNodeB could reconfigure the WCD's service to be on just two carriers or perhaps on just one carrier. Or if the eNodeB is currently serving a WCD on two carriers, the eNodeB could reconfigure the WCD's service to be on just one carrier. By reducing the number of carriers on which the eNodeB serves the WCD, the eNodeB might reduce the extent of air interface resource that could be allocated per unit time to the WCD.

In accordance with the present disclosure, however, the eNodeB could also take action to help offset or compensate for the impact of the reduced number of carriers on the WCD. Namely, in addition to decreasing the number of carriers on which the eNodeB serves the WCD, the eNodeB could also increase the number of MIMO layers of communication between the eNodeB and the WCD. The increased number of MIMO layers could thereby enable a greater extent of concurrent data communication on a given set of air interface resources, thereby helping to offset the reduction in throughput resulting from the reduced number of carriers.

By way of example, say the eNodeB is initially serving the WCD on three carriers using 2×2 MIMO, such that the eNodeB and WCD are each using two antennas on each of the three carriers, defining three layers across the three carriers. Each such layer could carry a separate respective data stream. With this arrangement, the eNodeB and WCD could thus effectively engage in concurrent communication of six data streams with each other. When the eNodeB is faced with a capacity constraint (e.g., an threshold heavily loaded air interface) or other trigger, the eNodeB could reduce the number of carriers on which it serves the WCD, transitioning to serve the WCD on just two carriers, still with 2×2 MIMO. But in that case, there would then be just four concurrent streams (two on each of two carriers).

Per the present disclosure, in that situation, a more efficient transition could be for the eNodeB to reduce the number of carriers on which it serves the WCD to just a single carrier, and for the eNodeB to increase the MIMO order to 4×4 MIMO. That would likewise result in four concurrent streams. But (i) it would use only one carrier, rather than two carriers and (ii) it would use fewer total air interface resources for a given data communication, since the four streams could share a common set of allocated resources on the single carrier.

As another example, say the eNodeB is initially serving the WCD on two carriers using 2×2 MIMO, and assume the eNodeB and WCD have 100 units of data to communicate with each other. In that arrangement, assume further that 50 units of the data would be scheduled respectively on each of the two carriers, and that the 2×2 MIMO would allow for use of 10 resource blocks per carrier, with each resource block carrying both of the 2 layers. Faced with a desire to increase air interface capacity or in response to another trigger, the eNodeB could then responsively reduce the number of carriers on which it serves the WCD to just one carrier. Yet the eNodeB could further responsively increase the MIMO order used for its communication with the WCD from 2×2 MIMO to 4×4 MIMO. This way, it could be possible to use just the 10 resource blocks on that one carrier, with each resource block carrying all 4 of the layers. Thus, the total number of required resource blocks using a single carrier and 4×4 MIMO could be half of the total number of resource blocks using two carriers and 2×2 MIMO.

As further noted above, the eNodeB could condition its increase in MIMO layers on a determination that the WCD at issue is in sufficiently good RF coverage to likely support differentiation of the multiple spatially multiplexed streams. To facilitate this in practice, the eNodeB may from time to time receive channel quality reports or other such RF measurement reports from the WCD, and the eNodeB could decide based on such reports whether the WCD's RF coverage is sufficiently strong (e.g., at least as strong as an engineering-set threshold). If the eNodeB thereby determines that the WCD's coverage is sufficiently strong, then the eNodeB could possibly increase the MIMO order as described above. Whereas, if the eNodeB thereby determines that the WCD's coverage is not sufficiently strong, then the eNodeB could forgo increasing the MIMO order as described above.

Figure 2:
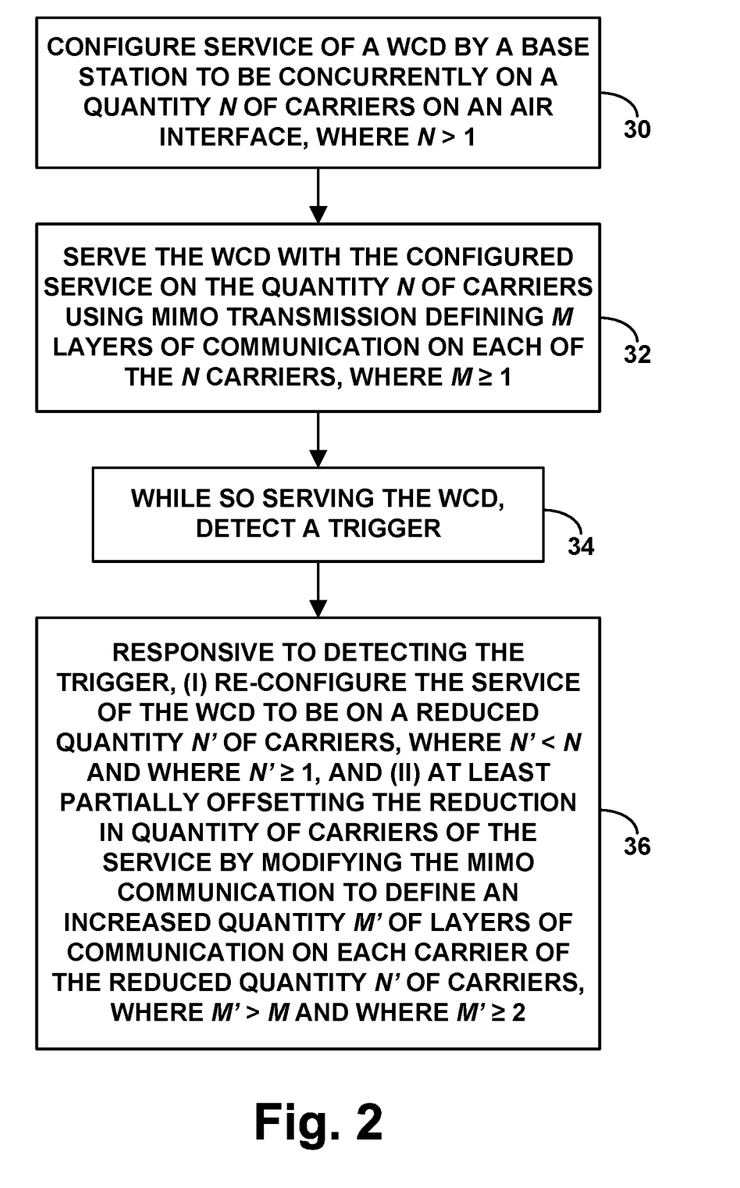
FIG. 2 is a flow chart depicting example operations in accordance with the disclosure.

FIG. 2 is next a flow chart depicting a method that can be carried out in accordance with this disclosure, to control communication over an air interface between a base station and a WCD. As shown in FIG. 2, at block 30, the method includes configuring service of the WCD by the base station to be concurrently on a quantity N of carriers on the air interface, where N>1. And at block 32, the method involves the base station serving the WCD with the configured service on the quantity N of carriers using MIMO transmission defining M layers of communication on each of the N carriers, where M≥1. At block 34, the method then involves, while so serving the WCD, the base station detecting a trigger. And at block 36, the method then involves, responsive to detecting the trigger, (i) the base station re-configuring the service of the WCD to be on a reduced quantity N' of carriers, where N'<N and where N'≥1, and (ii) at least partially offsetting the reduction in quantity of carriers of the service by modifying the MIMO communication to define an increased quantity M' of layers of communication on each carrier of the reduced quantity N' of carriers, where M'>M and where M'≥2.

In line with the discussion above, the act of configuring the service of the WCD to be on the quantity N of carriers could involve (i) the base station recording in a context record for the WCD identities of the N carriers and (ii) the base station transmitting to the WCD a first radio-link-layer configuration message (e.g., RRC connection reconfiguration message) identifying the N carriers for the service. In turn, the act of re-configuring the service of the WCD to be on the reduced quantity N' of carriers could involve (i) the base station recording in the context record for the WCD identities of the N' carriers and (ii) the base station transmitting to the WCD a second radio-link-layer configuration message (e.g., RRC connection reconfiguration message) identifying the N' carriers for the service.

Further, as discussed above, each layer of the M layers could define a separate respective portion of data to be communicated to or from the WCD, the MIMO communication defining the M layers of communication on each of the N carriers distributes the M layers among resources of the N carriers. Thus, the act of serving the WCD with the configured service on the quantity N of carriers using MIMO communication defining the M layers of communication on each of the N carriers could involve (i) scheduling data communication to occur concurrently on the N carriers to or from the WCD, where scheduling the data communication comprises transmitting to the WCD over the air interface a scheduling directive (e.g., DCI message) specifying respectively for each carrier of the N carriers certain air interface resources on the carrier that will carry data of the data communication, (ii) including in the scheduling directive a specification of the M layers of communication, and (iii) in accordance with the scheduling directive, engaging in the scheduled data communication to or from the WCD concurrently on each of the N carriers, wherein each layer of the M layers is distributed among the N carriers on the air interface resources specified respectively for each carrier.

Likewise, each layer of the M' layers could define a separate respective portion of data to be communicated to or from the WCD, and (i) the act of re-configuring the service of the WCD to be on the reduced quantity N' of carriers could involve the base station transmitting to the WCD a radio-link-layer control message identifying the N' carriers rather than the N carriers and (ii) modifying the MIMO communication to define the increased quantity M' of layers of communication on each carrier of the reduced quantity N' of carriers could involve, in a subsequent scheduling directive to the WCD, including a specification of the M' layers of communication.

In an implementation of this method, the increased quantity M' of MIMO layers could be a multiple p of the initial quantity M of MIMO layers, and the initial quantity N of carriers could be at least a multiple p of the reduced quantity N' of carriers and might be the multiple p of the reduced quantity N' of carriers. Phrased another way the act of reducing the quantity of carriers is from N carriers to N' carriers, where N is a multiple p of N', and where p>1, the act of increasing the quantity of MIMO layers is from M layers to M' layers, where M' is a multiple q of M, and where q>1, and q≥p.

For example, the base station could first serve the WCD on 2 carriers with 1 MIMO layer (effectively SISO), and the base station could reduce the number of carriers to 1 and increase the number of MIMO layers to 2, so as to then serve the WCD on 1 carrier with 2 MIMO layers. And as another example, the base station could first serve the WCE on 3 carriers with 2 MIMO layers, and the base station could reduce the number of carriers to 1 or 2 and increase the number of MIMO layers to 4. Other examples are possible as well.

Further, in line with the discussion above, the base station could determine whether the WCD has threshold strong coverage from the base station, in which case the act of modifying the MIMO communication to define the increased quantity of layers of communication could be additionally responsive to the base station's determination that the WCD has the threshold strong coverage from the base station. And the act of detecting the trigger could involve detecting that load on the air interface is threshold high.

Figure 3:
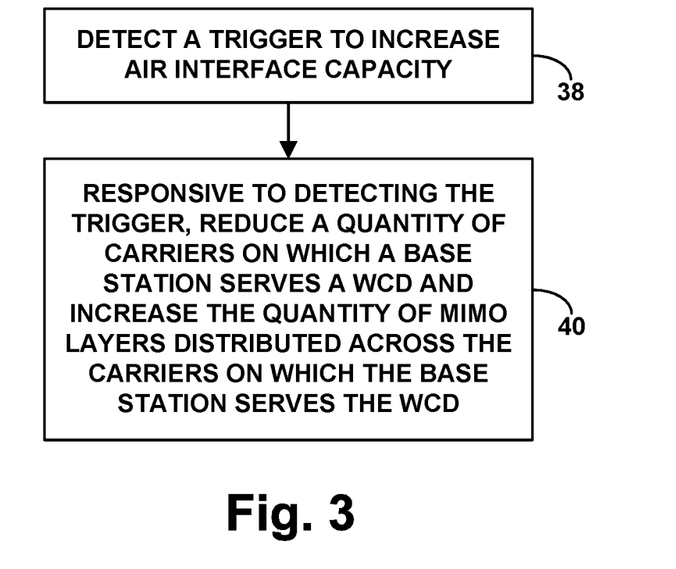
FIG. 3 is another flow chart depicting example operations in accordance with the disclosure.

FIG. 3 is next another flow chart depicting a method that can be carried out in accordance with this disclosure, to control communication over an air interface between a base station and a WCD. This method could apply in a scenario where the base station serves the WCD on a quantity of carriers and with MIMO communication on a quantity of MIMO layers (one or more MIMO layers) distributed across the carriers. As shown in FIG. 3, at block 38, the method includes the base station detecting a trigger to increase air interface capacity. And at block 40, the method includes, responsive to detecting the trigger, the base station reducing the quantity of carriers on which the base station serves the WCD (e.g., transitioning from serving the WCD on two or more carriers to serving the WCD on just a single carrier, or another transition in line with the discussion herein) and, in order to at least partially offset the reduction in quantity of carriers on which the base station serves the WCD, the base station increasing the quantity of MIMO layers distributed across the carriers on which the base station serves the WCD.

Figure 4:
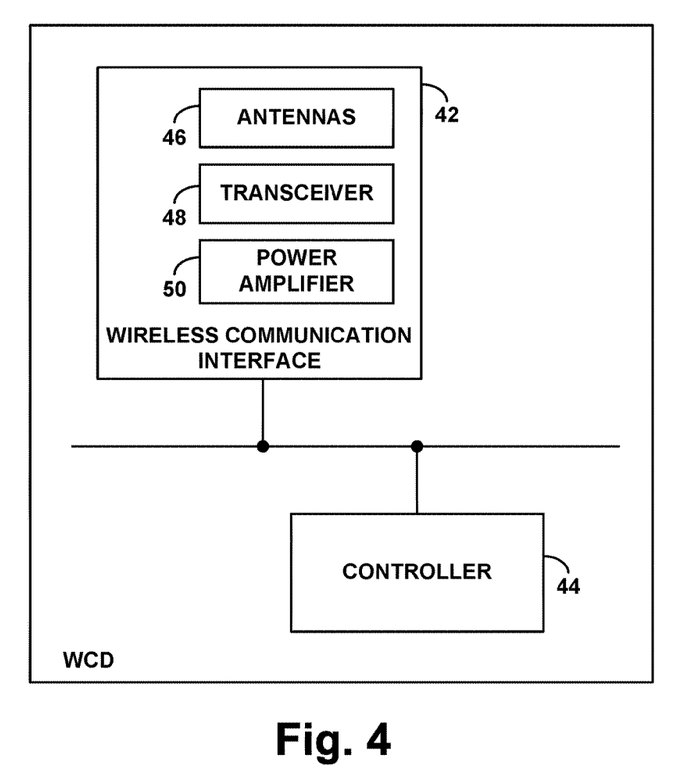
FIG. 4 is a simplified block diagram of an example WCD operable in accordance with the disclosure.

FIG. 4 is next a simplified block diagram of an example WCD operable in line with the discussion above. As shown, the example WCD includes a wireless communication interface 42 and a controller 44, which could be integrated or communicatively linked together. The wireless communication interface 42 could include antennas 46, a transceiver 48, and a power amplifier 50, to cooperatively facilitate air interface communication. And the controller could then include one or more processing units, non-transitory data storage, and program instructions stored in the data storage and executable by the processing unit(s) to carry out various operations such as (i) to receive from a serving base station a control message directing the WCD to operate on a particular set of carriers, and to responsively cause the WCD to tune to and operate on those carriers, and (ii) to receive from the base station a scheduling directive specifying a MIMO configuration and to responsively engage in air interface communication with the base station in accordance with the scheduling directive and MIMO configuration, such as using an indicated number of the antennas 46 to communicate on indicated air interface resources.

Figure 5:
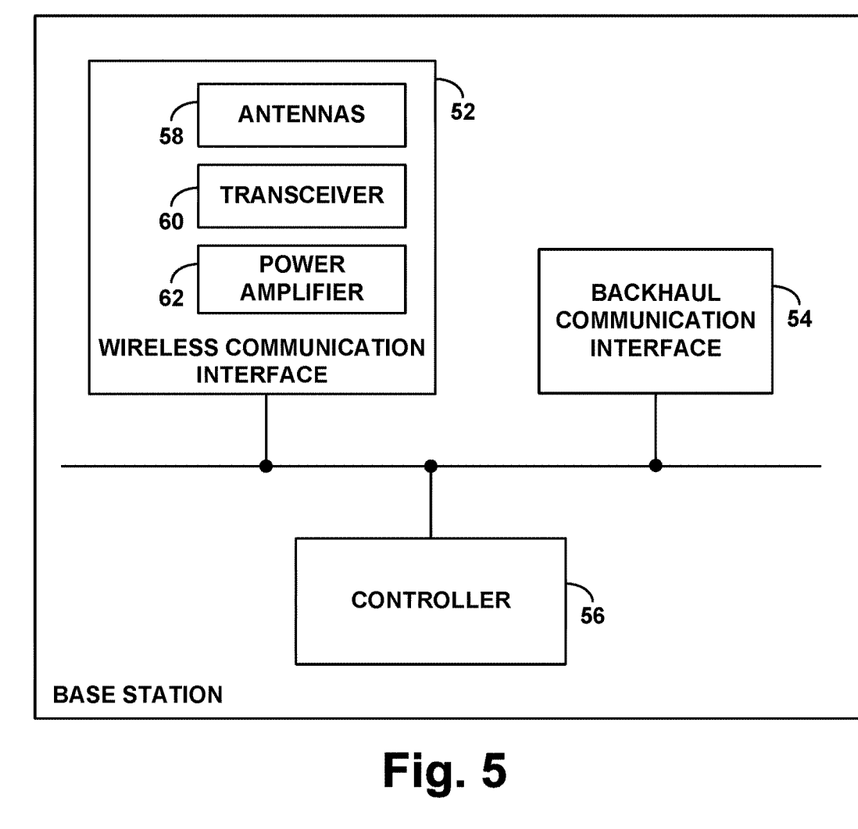
FIG. 5 is a simplified block diagram of an example base station operable in accordance with the disclosure.

Finally, FIG. 5 is a simplified block diagram of an example base station operable in line with the discussion above. As shown, the example base station includes a wireless communication interface 52, a backhaul communication interface 54, and a controller 56, which could be integrated or communicatively linked together.

The wireless communication interface 52 could include antennas 58, a transceiver 60, and a power amplifier 62, to cooperatively facilitate air interface communication. And the backhaul communication interface 54 could include a wireless and/or wireless network communication module configured to support communication on a core access network such as that shown in FIG. 1 for instance.

The controller 56 could then be configured (e.g., with one or more processing units, non-transitory data storage, and program instructions stored in the data storage and executable by the one or more processing units) to carry out various operations described herein. For example, the controller could be configured to (i) cause the base station to serve the WCD on a quantity of carriers and with MIMO communication on a quantity of MIMO layers distributed across the carriers, (ii) detect a trigger to increase air interface capacity, and (iii) responsive to detecting the trigger, cause the base station to reduce the quantity of carriers on which the base station serves the WCD and, in order to at least partially offset the reduction in quantity of carriers on which the base station serves the WCD, to increase the quantity of MIMO layers distributed across the carriers on which the base station serves the WCD (e.g., to direct the WCD to use a greater number of antennas, and to begin using a greater number of the antennas 58 for communicating with the WCD).

Various features described above in connection with particular embodiments or implementations can be applied as well in connection with other embodiments or implementations. Further, those skilled in the art will understand, that various changes and modifications may be made to the described embodiments and implementations without departing from the true scope and spirit of the invention.

We claim:

1. A method of controlling communication over an air interface between a base station and a wireless communication device (WCD), the method comprising:
configuring service of the WCD by the base station to be concurrently on a quantity N of carriers on the air interface, wherein N>1, and serving by the base station the WCD with the configured service on the quantity N of carriers using multiple-input multiple-output (MIMO) transmission defining M layers of communication on each of the N carriers, wherein M≥1;
detecting by the base station a trigger; and
responsive to detecting the trigger, (i) re-configuring by the base station the service of the WCD to be on a reduced quantity N' of carriers, wherein N'<N and wherein N'≥1, and (ii) at least partially offsetting the reduction in quantity of carriers of the service by modifying the MIMO communication to define an increased quantity M' of layers of communication on each carrier of the reduced quantity N' of carriers, wherein M'>M and wherein M'≥2.

2. The method of claim 1,
wherein configuring the service of the WCD to be on the quantity N of carriers comprises (i) recording by the base station in a context record for the WCD identities of the N carriers and (ii) transmitting from the base station to the WCD a first radio-link-layer configuration message identifying the N carriers for the service, and
wherein re-configuring the service of the WCD to be on the reduced quantity N' of carriers comprises (i) recording by the base station in the context record for the WCD identities of the N' carriers and (ii) transmitting from the base station to the WCD a second radio-link-layer configuration message identifying the N' carriers for the service.

3. The method of claim 2, wherein each of the first and second radio-link-layer configuration messages is a Radio Resource Control (RRC) connection configuration message.

4. The method of claim 1, wherein each layer of the M layers defines a separate respective portion of data to be communicated to or from the WCD, and wherein serving the WCD with the configured service on the quantity N of carriers using MIMO communication defining the M layers of communication on each of the N carriers comprises:
scheduling data communication to occur concurrently on the N carriers to or from the WCD, wherein scheduling the data communication comprises transmitting to the WCD over the air interface a scheduling directive specifying respectively for each carrier of the N carriers certain air interface resources on the carrier that will carry data of the data communication;
including in the scheduling directive a specification of the M layers of communication; and
in accordance with the scheduling directive, engaging in the scheduled data communication to or from the WCD concurrently on each of the N carriers, wherein each layer of the M layers is distributed among the N carriers on the air interface resources specified respectively for each carrier.

5. The method of claim 4, wherein the scheduling directive is a Downlink Control Information (DCI) message, and wherein transmitting the scheduling directive to the WCD over the air interface comprises transmitting the DCI on a downlink control channel for receipt by the WCD.

6. The method of claim 4,
wherein each layer of the M' layers defines a separate respective portion of data to be communicated to or from the WCD,
wherein re-configuring by the base station the service of the WCD to be on the reduced quantity N' of carriers comprises transmitting from the base station to the WCD a radio-link-layer control message identifying the N' carriers rather than the N carriers, and
wherein modifying the MIMO communication to define the increased quantity M' of layers of communication on each carrier of the reduced quantity N' of carriers comprises, in a subsequent scheduling directive to the WCD, including a specification of the M' layers of communication.

7. The method of claim 6, wherein the subsequent scheduling directive is a Downlink Control Information (DCI) message.

8. The method of claim 1, wherein N is at least a multiple p of N', wherein p>1, and wherein M' is the multiple p of M.

9. The method of claim 8, wherein N is the multiple p of N'.

10. The method of claim 1, further comprising:
determining by the base station whether the WCD has threshold strong coverage from the base station,
wherein modifying the MIMO communication to define the increased quantity of layers of communication is additionally responsive to the determining that the WCD has the threshold strong coverage from the base station.

11. The method of claim 1, wherein each layer of the M layers defines a separate respective portion of data to be communicated to or from the WCD, wherein the MIMO communication defining the M layers of communication on each of the N carriers distributes the M layers among resources of the N carriers.

12. The method of claim 1, wherein detecting the trigger comprises detecting that load on the air interface is threshold high.

13. A method of controlling communication over an air interface between a base station and a wireless communication device (WCD), wherein the base station serves the WCD on a quantity of carriers and with multiple-input multiple-output (MIMO) communication on a quantity of MIMO layers distributed across the carriers, the method comprising:
detecting by the base station a trigger to increase air interface capacity; and
responsive to detecting the trigger, reducing by the base station the quantity of carriers on which the base station serves the WCD and, to at least partially offset the reduction in quantity of carriers on which the base station serves the WCD, increasing by the base station the quantity of MIMO layers distributed across the carriers on which the base station serves the WCD.

14. The method of claim 13, wherein reducing the quantity of carriers on which the base station serves the WCD comprises transitioning from (i) the base station serving the WCD on two or more carriers to (ii) the base station serving the WCD on just a single carrier.

15. A base station configured to control communication over an air interface between the base station and a wireless communication device (WCD), the base station comprising:
an antenna structure configured for communication over the air interface;
a backhaul communication interface configured for communication on a core access network; and
a controller configured to carry out operations including (i) causing the base station to serve the WCD on a quantity of carriers and with multiple-input multiple-output (MIMO) communication on a quantity of MIMO layers distributed across the carriers, (ii) detecting a trigger to increase air interface capacity, and (iii) responsive to detecting the trigger, causing the base station to reduce the quantity of carriers on which the base station serves the WCD and, to at least partially offset the reduction in quantity of carriers on which the base station serves the WCD, to increase the quantity of MIMO layers distributed across the carriers on which the base station serves the WCD.

16. The base station of claim 15, wherein detecting the trigger to increase air interface capacity comprises determining that load on the air interface is threshold high.

17. The base station of claim 15, wherein causing the base station to reduce the quantity of carriers on which the base station serves the WCD comprises causing the base station (i) to transmit to the WCD a radio-link-layer configuration message specifying the reduced quantity of carriers on which the base station serves the WCD and (ii) to engage in communication with the WCD on the reduced quantity of carriers.

18. The base station of claim 15, wherein causing the base station to increase the quantity of MIMO layers distributed across the carriers on which the base station serves the WCD comprises causing the base station (i) to include in a scheduling directive to the WCD a specification of the increased quantity of MIMO layers and (ii) to engage in communication with the WCD on the increased quantity of MIMO layers.

19. The base station of claim 15,
   wherein reducing the quantity of carriers is from N carriers to N' carriers, wherein N is a multiple p of N', and wherein p>1,
   wherein increasing the quantity of MIMO layers is from M layers to M' layers, wherein M' is a multiple q of M, and wherein q>1, and
   wherein q≥p.

20. The base station of claim 15, wherein the controller is further configured to make a determination that the WCD has threshold strong coverage from the base station, wherein causing the base station to increase the quantity of MIMO layers is further responsive to the determination that the WCD has threshold strong coverage from the base station.

* * * * *